Aug. 30, 1966  R. E. McGAUGHEY  3,269,045
REVOLVER WITH SHOOTING TRIGGER AND DIGITALLY ENGAGEABLE
AUXILIARY MEANS SECURED THERETO
Filed March 11, 1965                                5 Sheets-Sheet 1

INVENTOR
Robert E. McGaughey
BY *Jacobi & Davidson*
ATTORNEYS

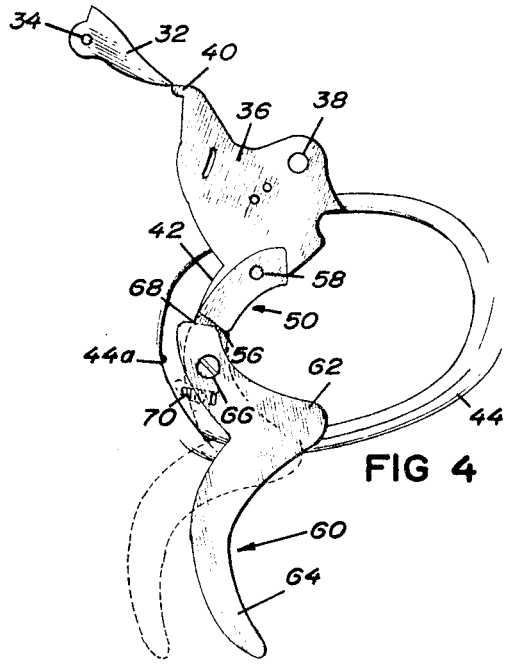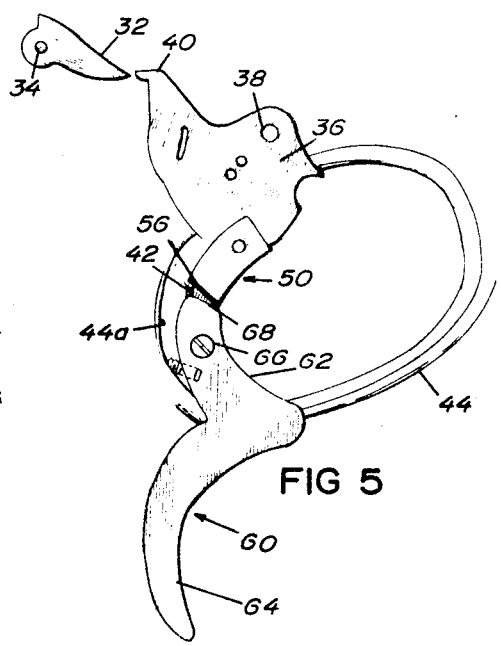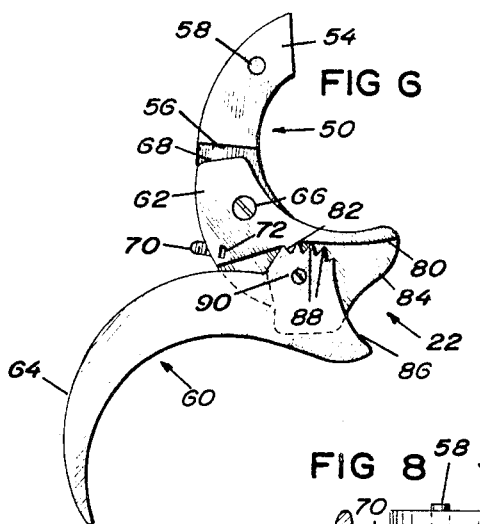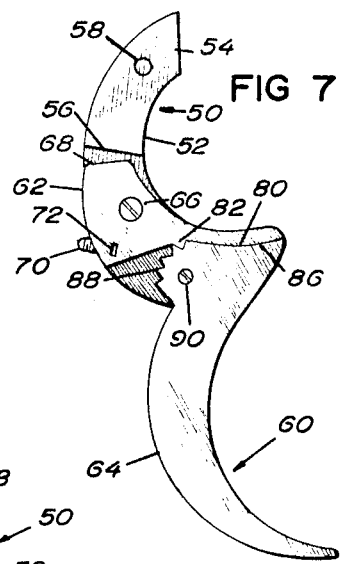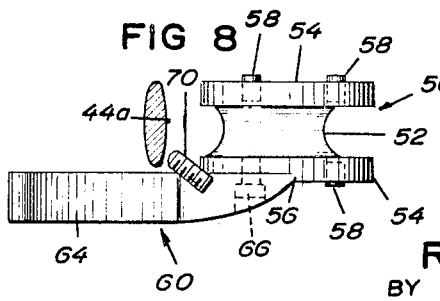

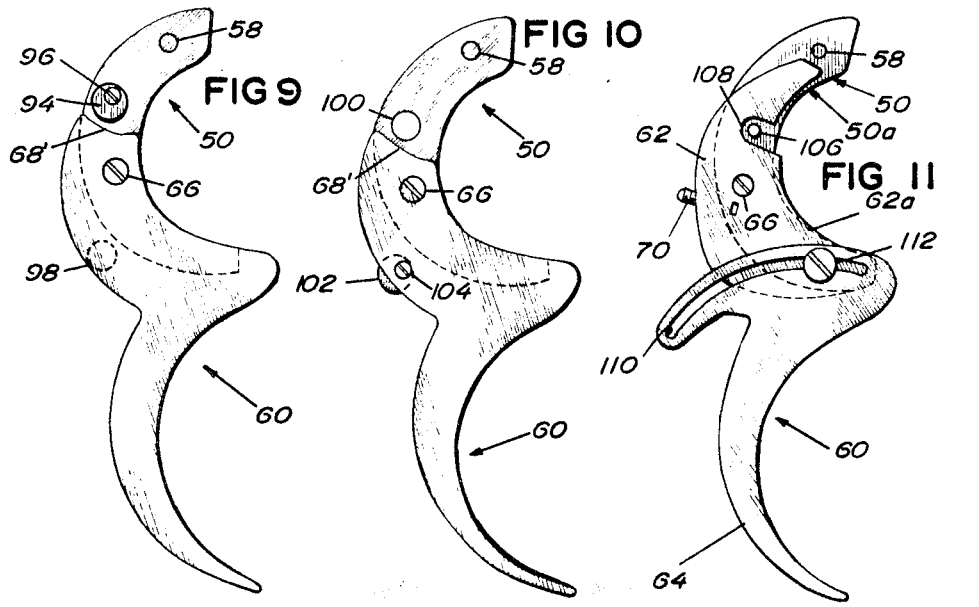
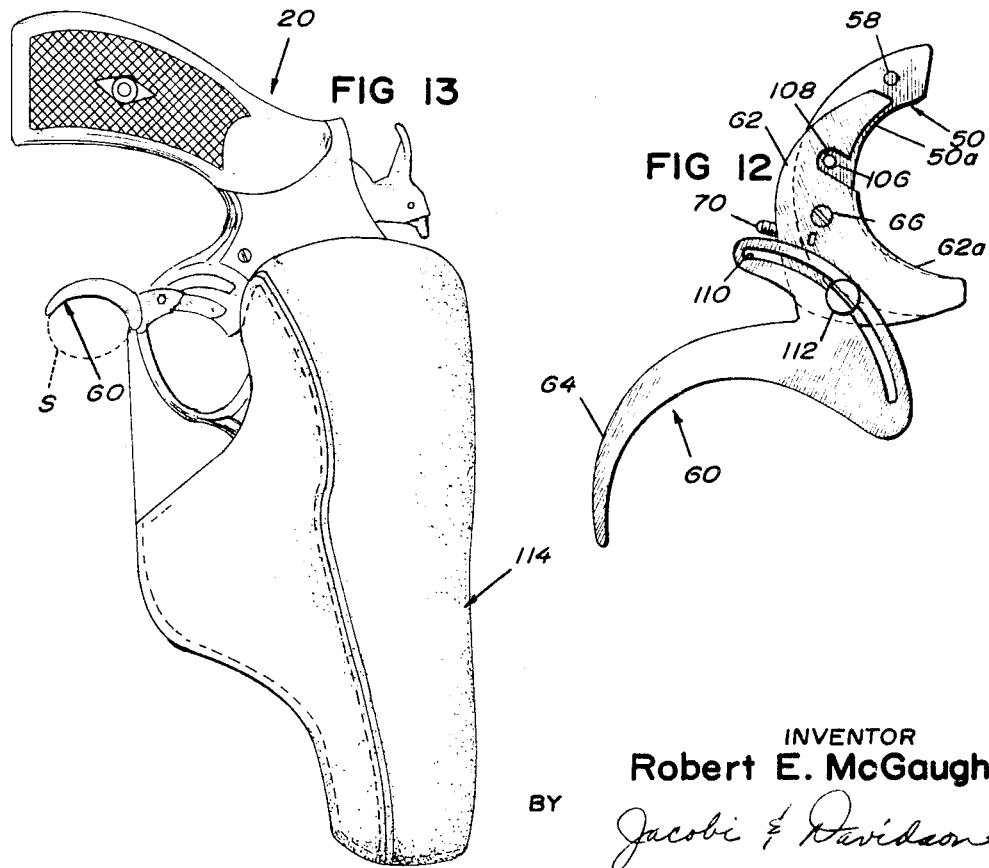

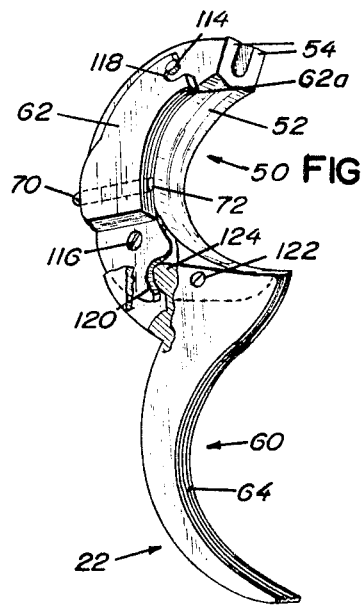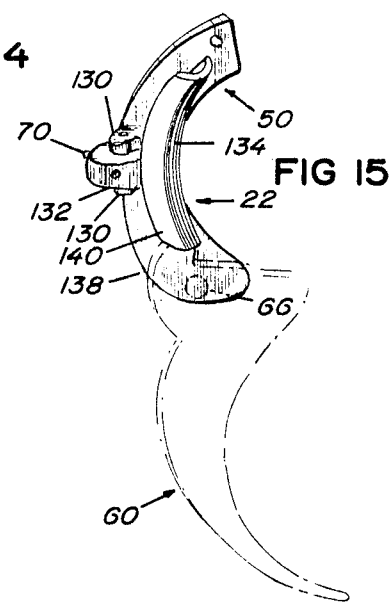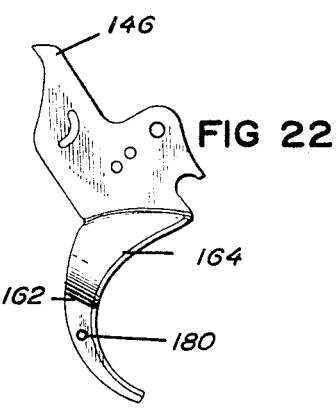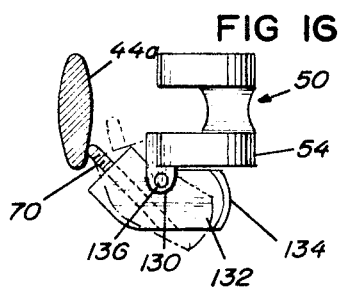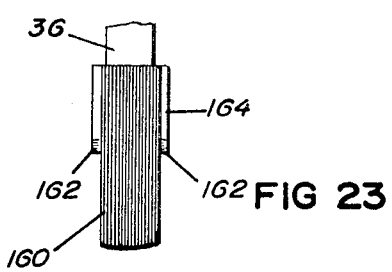

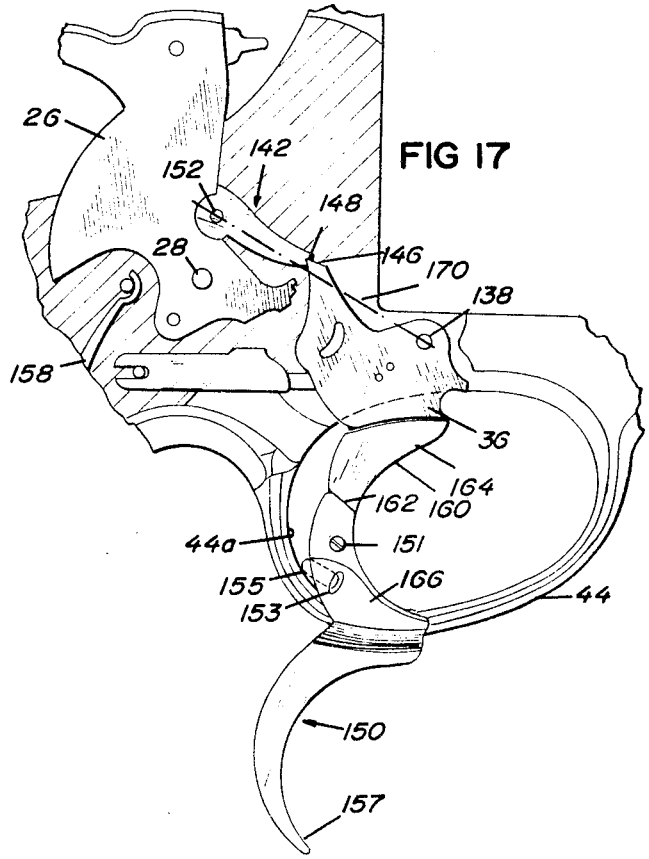
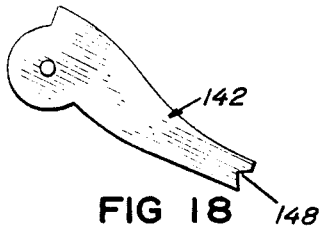
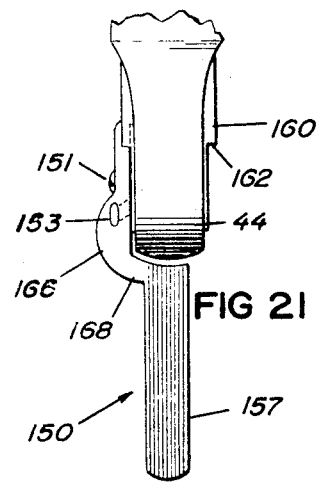
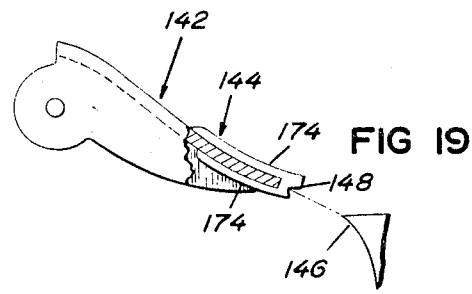
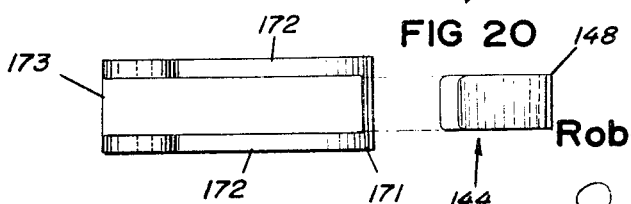
INVENTOR
Robert E. McGaughey United States Patent Office 3,269,045
Patented August 30, 1966

3,269,045
REVOLVER WITH SHOOTING TRIGGER AND DIGITALLY ENGAGEABLE AUXILIARY MEANS SECURED THERETO
Robert E. McGaughey, 51 E. 39th St., Hialeah, Fla.
Filed Mar. 11, 1965, Ser. No. 438,836
18 Claims. (Cl. 42—65)

This invention relates to firearms of the revolver type, and particularly to a revolver lock and to an auxiliary mechanism adapted for manual actuation, control and safetying of the revolver hammer cocking process.

The modern revolver features a two-fold selection in its hammer cocking operation. The one, designated "single action" is used primarily when accuracy is demanded, and the other, designated "double action" is used mainly at short to point blank range for rapid, rather than accurate shooting.

Double action cocking operation is performed by retracting the trigger from its inactive or forward position, rotating the cylinder, forcing the hammer back or rearward to a point of sudden release, whereupon it has free fall, in an uncontrolled fashion, upon the cartridge.

Double action shooting can be performed swiftly, however, accuracy cannot be expected and a rapid succession of such shots is apt to cover a large area, because of the hand tension it generates. Double action is seldom used by the marksman when accuracy is required, and instead, he depends upon the superb accuracy possible by shooting "single action."

Single action shooting is accomplished by the following steps: (a) a properly comfortable grip, (b) a relaxed hand, (c) pointing weapon in general direction of target, (d) thumbing the hammer to a cock position, (e) general realignment of hand and gun on target, (f) specific and fine alignment of gun sights on target, and (g) careful relaxed squeeze of the trigger.

It is common knowledge among shooters that the steady relaxed shooting hand becomes tense and often uncontrollable by the following contributing factors: (a) hand fatigue from thumbing the hammer, (b) gun sighting interfered with by thumb motions, prolonging the outstretched arm, and weighted hand condition, (c) momentary blind spot caused by thumb or gun barrel which necessitates target re-evaluation and re-sighting. The result of the foregoing factors is time loss and poor marksmanship.

When the conventional revolver hammer is cocked, the weapon is extremely dangerous. The spring energized hammer is prevented from falling upon a live cartridge only by engagement means with a thin notch on the hammer base, a notch that wears with use. There is no other mechanical means provided for safely holding the hammer in its cocked position. The lack of a trigger safety of hammer safety further contributes to the dangers inherent in a cocked revolver.

The various experimental procedures in thumb cocking the conventional revolver constitute potential dangers. The occasional necessity for fast shooting by policemen on duty creates great danger to bystanders from shots often accidentally and prematurely discharged, due to the present awkwardness involved in thumb cocking.

Among several detrimental factors associated generally with conventional revolver shooting requirements is the frustration and hinderance encountered with the so-called quick draw, wherein the revolver must be quickly unholstered as the shooter gropes for the hammer with his thumb while simultaneously seeking to interpose his forefinger between trigger and trigger guard. Proficiency in this requires much patient practice and at best is awkward and difficult.

Another consideration is the frequent necessity for lowering the hammer back to the precautionary forward position. This requires thumb holding the hammer spur and literally pulling the trigger for hammer release. Should the operator's thumb slip, inadvertent discharge results.

Another consideration is the thumb pressure and hand force required to cock the hammer, in its long pivoting travel, from its rest position to fully cocked position. This is especially difficult for shooters with relatively stiff thumbs. Another consideration is the questionable degree of cocked hammer security, for prevention of inadvertent release of the hammer to the accidental discharge of a cartridge. This degree of security depends upon the condition of the hammer notch and the co-functioning engageable tip of the trigger lip. There is no adjustment possible in this engagement relationship of notch with tip, and grinding or honing, simple wear, or faulty parts makes this a potential hazard.

Another consideration is the necessity for light trigger pull, or firing response to slight digital pressure, with respect to fine accuracy. In many cases with conventional revolvers, the hammer notch is honed to reduce hammer spring load friction and do thus lighten the trigger pull. Such honing must be done by a qualified gunsmith and is therefore always an expensive proposition. Furthermore, being a fine machining operation, the accuracy involved is, at best, uncertain.

Another very important consideration is one concerning the principal method resorted to for speed cocking the revolver, a principle long practiced by large numbers of police officers to develop proficiency. This consists of pulling the trigger until the hammer pivots back a certain distance and then quickly finishing the cocking movement by "thumbing" the hammer on back to full cocked position. This is a good honest attempt toward speeding up timed rapid fire practice but it is dangerous and uncertain, in that there is no mechanical element to prevent the hammer from dropping forward upon the live cartridge, should the shooter fail to catch the hammer spur in its movement before the hammer sear escapes past the trigger lip. This method required tremendous amounts of practice and was resorted to as a result of the slowness and other drawbacks encountered in the hammer cocking process.

Another consideration is the wide variations in types of hands and fingers, with respect to size, strength, maneuverability, endurance and the like. The absence of features of adjustability on the conventional revolver, with respect to accommodating this hand variation, contributes to much hand fatigue and annoyance among shooters.

Another consideration is the distance of hammer travel in the two types of conventional revolvers currently manufactured. The older style revolver still manufactured in great quantity, functions with long hammer travel while the other is the "short action" revolver whose hammer travel is about half that of the former. The short action is faster and is very popular among police officers for obvious reasons.

Although further consideration might be herein given to other conventional revolver factors with consideration to the objectives of this present invention, it can suffice to state that the shooter's control generally, in the hammer cocking process, whether short action or old style, is very questionable and has numerous times proved fatal.

With regard to the foregoing facts and considerations, the objects of the present invention are set forth hereinafter.

The primary object of this present invention is to overcome dangers associated with prior forms of revolvers and to provide in their stead and improved form of revolver wherein the revolver lock auxiliary device combines adapted means of construction operable: (a) to increase the safety of the shooter and innocent bystanders, (b) to provide dependable manual control over the hammer cocking procedure; (c) to provide more control and personal safety when shooter elects to fire his weapon by conventional single action hammer cocking process, (d) to provide cocking control means whereby the shooter may change his mind, halt the cocking action in process, and manually hold and safety the hammer when cocking in conventional double action process, (e) to provide a safety block against pulling the shooting trigger, that is effective both with auxiliary actuated hammer cocking, and in conventional single action cocking that is instant and automatic in the prevention of inadvertent discharge of the weapon; (f) to present the shooter with finger tip convenience for manual control, and manual "hold" on the safety block mechanism, (g) to provide leverage power under digital control in the operation of the trigger block, requiring safetywise, that lever force be released to unblock the shooting trigger in order to fire the weapon; (h) to provide means whereby the shooting trigger may be instantly squeezed without having to manually resort to unlatching some adapted conventional safety mechanism; (i) to provide direct uninterrupted lowering of the hammer from cocked and blocked position to security position by merely releasing finger pressure on the auxiliary cocking trigger and (j) to prevent revolver from accidental discharge by inadvertent collision of the auxiliary trigger with an obstruction.

Other objects of the present invention are: (a) to make the hammer cocking process faster, easier and more reliable; (b) to make the fast draw process faster and easier with greater convenience; (c) to assist in making the gun sighting process easier and more convenient thereby enabling fast accurate shooting; (d) to make easier and safer certain conventional methods of hammer cocking with the thumb in the style of single action shooting; (e) to provide a "cocking trigger" stop and block construction that functions equally well with the "removable auxiliary trigger" lever attached or detached; (f) to provide a cocking control device operated by the fingers to the elimination of thumb cocking of hammer thus avoiding the interruptions to fine gun sighting in the nature of blind spot, misalignment, and other like factors, thus contributing generally to the simplification of sighting the weapon, (g) to provide a cocking control device that generally contributes to effective increase of accurate revolver firepower; (h) to provide the revolver shooting trigger with an additional leverage mechanism in the nature of a trigger booster, convenient to the shooters' fingers and comfortable in the hand, providing a faster, safer and easier to operate system of cocking and shooting; (i) to effect a shortening of the length of hammer travel in cocking and firing, to enhance considerably, the speed of effective shooting; (j) to provide means whereby the hammer, under full control with safety trigger block can be partially cocked with the index trigger finger to a position in its cocking movement, whereupon the hammer spur may be engaged by the thumb to complete the cocking movement, all of this being accomplished without danger of inadvertent slip of the hammer to discharge the weapon.

Further objects of the present invention are: (a) to provide for digital application upon the auxiliary trigger to enable manual retention of the hammer in the cocked position in combination with the provision of digital control of the shooting trigger block safetying means; (b) to provide firing mechanism adjustability means for marginal safety to effectively influence the working relationship of both external and internal co-functioning parts, with respect to cocking procedure, in simultaneous safetying of both the trigger and the hammer, said adjustability additionally providing for security against possibility of inadvertent disengagement of co-working parts due to excessive wear; (c) to provide firing mechanism adjustability means in combination with reverse leverage means to provide light pressure forefinger operation of the shooting trigger for hammer holding and trigger blocking; (d) to provide through mechanical engagement of parts, the simultaneous blocking of the shooting trigger and the hammer sear, thus effectively blocking and safetying the hammer in combination with trigger blocking performing double preventive means against accidental premature discharge of the weapon, (e) to provide an auxiliary hammer cocking mechanism that does not interfere with conventional revolver functions of so-called single and double action, and (f) to provide easier, faster and improved double action shooting by virtue of the leverage of the auxiliary trigger overcoming the hammer spring power in addition to the combination digital power application upon the respective trigger levers.

Additional objects of the present invention are: (a) to enable external, easily accessible adjustment means to enable variable degrees of required pressure or weight of shooting trigger pull, from hard pull to hair trigger, (b) to provide means to increase the "revolver trigger" leverage power in variable degrees, with convenient means for changing to various angles the auxiliary trigger member allowing for variable changes of direction of digital power application upon said auxiliary trigger, (c) to provide means for shortening the hammer travel in cocking, and the rigid holding of same with variable degrees of leverage power in the more or less short action cocked position, simultaneously with effective trigger blocking with variable leverage power effective through the auxiliary trigger, (d) to provide auxiliary trigger angle change means to increase at will, the leverage power in variable degrees for decreasing the mean finger load in cocking the hammer, and accordingly increasing the speed and ease of hammer cocking.

Still further objects of the present invention are: (a) to enable external and easily accessible means for quickly mounting or dismounting the auxiliary device to any conventional revolver, said mounting providing for operation by either right or left handed persons, (b) to provide external and easily accessible means for adjusting the auxiliary device to the comfortable suiting of various hand sizes and finger lengths, (c) to provide external, easy and accessible means for attaching and detaching the auxiliary trigger, (d) to provide a cocking control device that is externally adjustable to enable quick and easy mounting upon a wide variety of conventional revolvers, (e) to provide external means for quick and easy adaptation of auxiliary mechanism, thus providing the conventional revolver with three distinct actions identified (1) single, (2) double, and (3) auxiliary, enabling the shooter to meet more safely a wider range of emergency conditions, (f) to provide an externally adapted auxiliary device well constructed, rugged, and of durable and precision nature; (g) to provide cocking control auxiliary lever means to function alongside of and to the outside of the trigger guard with auxiliary trigger ranging below the trigger guard and adjustable at variable angles to accommodate varying hand types and finger lengths to facilitate convenient unhampered digital contact upon the auxiliary trigger, (h) to provide means whereby digital contact and manipulation upon the auxiliary trigger may be effected with impunity even while revolver is still holstered, such digital application and cocking trigger manipulation instantly enlarging the area between trigger guard and trigger for faster, easier, more direct and convenient application of the forefinger upon the shooting trigger, to greatly facilitate speed shooting, preparation, and personal readiness in event of challenge on the quick draw.

Other objects, advantages, and salient features of the present invention will become apparent from the following detailed description, which, taken in connection with the annexed drawings, discloses a preferred embodiment thereof.

Referring to the drawings:

FIGURE 4 is a side elevational view of the auxiliary device in its intermediate position, with the auxiliary trigger released from its blocking position;

FIGURE 5 is a fragmentary side elevational view of the auxiliary device in its rearward, firing position;

FIGURES 6 and 7 are fragmentary side elevational views of a modified form of auxiliary devices, shown adjusted to different positions;

FIGURE 8 is a top plan view of the modification of the auxiliary device shown in FIGURES 6 and 7;

FIGURES 9 and 10 are side elevational views of still further modified forms of auxiliary device;

FIGURES 11 and 12 are side elevational views of a further modification of auxiliary device, shown adjusted to different positions;

FIGURE 13 is a side elevational view of a revolver incorporating the auxiliary device of the present invention, shown disposed within a holster, with the auxiliary trigger shown in retracted position;

FIGURE 14 is a perspective view of a further modified form of auxiliary device;

FIGURE 15 is a side elevational view of a further modified form of auxiliary device;

FIGURE 16 is a top plan view of the modification of auxiliary device, shown in FIGURE 15;

FIGURE 17 is a side elevational view, partially in section, of a revolver lock construction shown in "short action" cocked position;

FIGURE 18 is an enlarged side elevational view of the revolver hammer sear of FIGURE 17;

FIGURE 19 is an enlarged side elevational view of a conventional revolver hammer sear incorporating a novel adapter device for providing a notch at the end thereof;

FIGURE 20 is an exploded bottom plan view of the hammer sear and adapter device shown in FIGURE 19;

FIGURE 21 is a fragmentary front end view of the revolver lock construction of FIGURE 17;

FIGURE 22 is a side elevational view of the shooting trigger of FIGURE 17 with the auxiliary trigger removed; and FIGURE 23 is an enlarged front end view of the lower portion of the shooting trigger of FIGURE 22.

In general, the present invention provides a revolver lock auxiliary device comprising related forms of construction adapted to co-function with a conventional revolver having a conventional firing mechanism therein. Without departing from its spirit and scope, the invention accomplishes its purposes broadly in different, but basically related, ways. Because of the several related ways, there are several embodiments incorporated in the present invention, the simplest of which will be used for purposes of this description. Naturally, on the conventional revolver, a shooting trigger is provided, with such shooting trigger being movable between a forward inactive position and a rearward firing position. An auxiliary device is provided, and in the simplest embodiment of the present invention, the auxiliary device provides a digitally engageable auxiliary means, such as, an auxiliary trigger adaptably secured to the shooting trigger and movable between a forward position and a rearward position. The forward position of the auxiliary trigger corresponds to the forward position of the shooting trigger, and the rearward position of the auxiliary trigger brings abutment means into engagement with the interior rear surface of the trigger guard.

When the auxiliary trigger is digitally engaged and operated to retract from its forward position to its readward position, it simultaneously moves the shooting trigger from its forward position to some intermediate position between its forward and its firing position, simultaneously blocking the shooting trigger to prevent firing of the revolver. With the auxiliary trigger in its rearward position and the shooting trigger in its intermediate position, the revolver hammer is cocked to a rearward position between its full cock and its firing position, and is suspended thereat in a manually held and safetied condition. As long as the auxiliary trigger is digitally held in its rearward position, it prevents any movement of the shooting trigger from its intermediate position to its firing position. However, when pressure upon the auxiliary trigger is released, even slightly, trigger blocking ceases, allowing corresponding slight pressure to be put upon the shooting trigger, thereby further moving the auxiliary trigger forwardly whereupon the shooting trigger can then be fully retracted from its intermediate position to its firing position, thereby operating the firing mechanism and firing the revolver.

Figure 1:
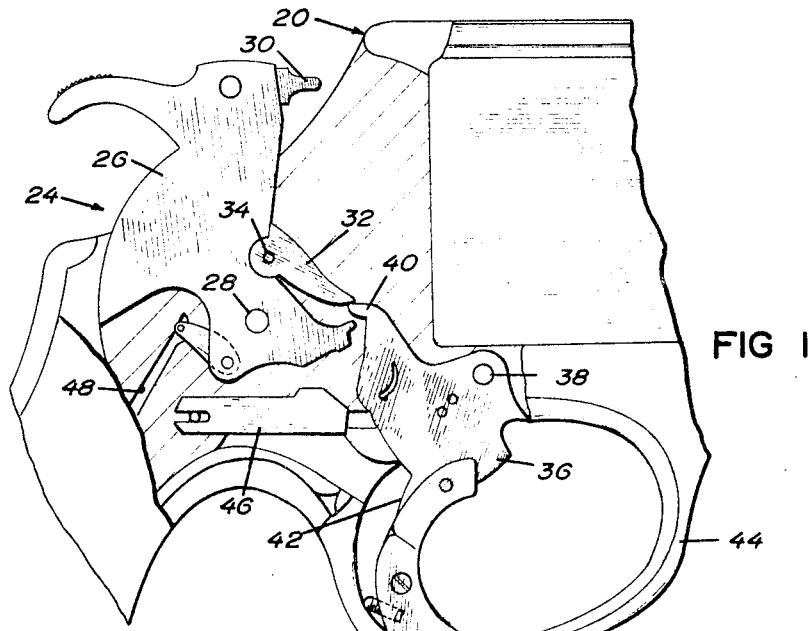
FIGURE 1 is a side elevational view, partly in section, of a conventional revolver incorporating the revolver lock auxiliary device of the present invention, shown in its full retracted position which also defines its respective trigger blocking, hammer holding and hammer blocking positions.

Referring now to the drawings, and particularly to FIGURE 1, there is illustrated a broken away section of a revolver generally designated 20 and a revolver lock auxiliary device generally designated 22 associated therewith. The revolver has a firing mechanism generally designated 24 which includes a hammer 26 pivotally mounted on a hammer pivot stud 28, and a firing pin 30 disposed on the upper forward surface of the hammer. A hammer sear 32 is pivotally mounted by a sear pivot pin 34 to the forward surface of the hammer 26. The firing mechanism also includes a shooting trigger 36 pivotally mounted by a pivot stud 38 and having in its upper rear surface, a sear actuating trigger lip 40. Naturally, the trigger 36 also includes a depending finger engageable portion 42 having a slight arcuate curvature and being disposed within a conventional trigger guard 44, provided on the revolver frame itself. The firing mechanism 24 also includes a rebound slide 46, a hammer spring 48, and other similar elements which comprise the conventional firing mechanism for a double action revolver. While the conventional firing mechanism necessarily co-functions with the present invention, it does not form any novel portion thereof.

Figure 2:
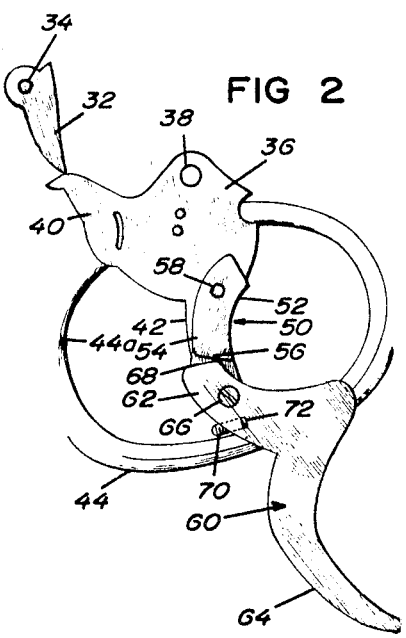
FIGURE 2 is a fragmentary side elevational view of the auxiliary device in its inactive, forward position.

For a more detailed explanation of the auxiliary means 22, in its simplest form, attention is directed to FIGURE 2 wherein the trigger assembly is shown in its forward or inactive position. In this position, it will be noted that the hammer sear 32 is engaged with the sear actuating trigger lip 40 well in advance of its rear edge. The auxiliary means includes a trigger bracket or shoe generally designated 50 and having a forward wall section 52 and a pair of opposite side wall sections 54, 54, only one of which is visible in FIGURE 2. The shoe 50 fits over the depending portion 42 of the shooting trigger with the sides 54 being disposed upon opposite sides of the shooting trigger, and the forward wall 52 being in engagement with the forward curved surface of the depending portion 42. The forward portion 52 can be serrated, knurled, or otherwise roughened to provide a more sure gripping surface. One of the side portions 54 is cut away to form a slanted abutment surface 56. The shoe 50 is mainly secured to the trigger 36 by set screws, studs, pins or the like, designated 58, and additionally by the auxiliary trigger pivot screw which at its terminal end frictionally bears upon the side surface of the shooting trigger 36.

An auxiliary trigger generally designated 60 is also provided, as can be seen from FIGURE 2, with such trigger including an upper portion 62 which acts as a pivot shield ridge which prevents finger sliding contact upon the trigger guard during auxiliary trigger retraction, and a lower arcuately curved finger engageable portion 64. The auxiliary trigger 60 is disposed aside the trigger guard 44, with the lower portion 64 depending beneath such trigger guard. A pivot screw, stud, pin, or the like, designated 66, and defining the auxiliary trigger pivot screw, passes through the upper portion 62 of the auxiliary trigger and thereby forms a pivot station whereat the auxiliary trigger is pivotally mounted to the shoe 50. For comfort and convenience, the screw 66 can be, and preferably is, countersunk. The top edge 68 of the upper portion 62 is likewise formed as a slanted abutment surface or shoulder which is adapted to compatibly mate in engagement with the shoulder 56 of the shoe, in the manner shown in FIGURES 1 and 3. Finally, an adjustment means in the form of an adjustable set screw 70, is mounted within an aperture 72 in the upper portion surface 62 of the auxiliary trigger 60. As can be seen, the rear end of the screw 70 projects beyond the rear portion of the upper surface 62, and moreover, such screw 70 is angled somewhat inwardly to enable it to engage the rear inner surface 44a of the trigger guard 44.

Figure 3:
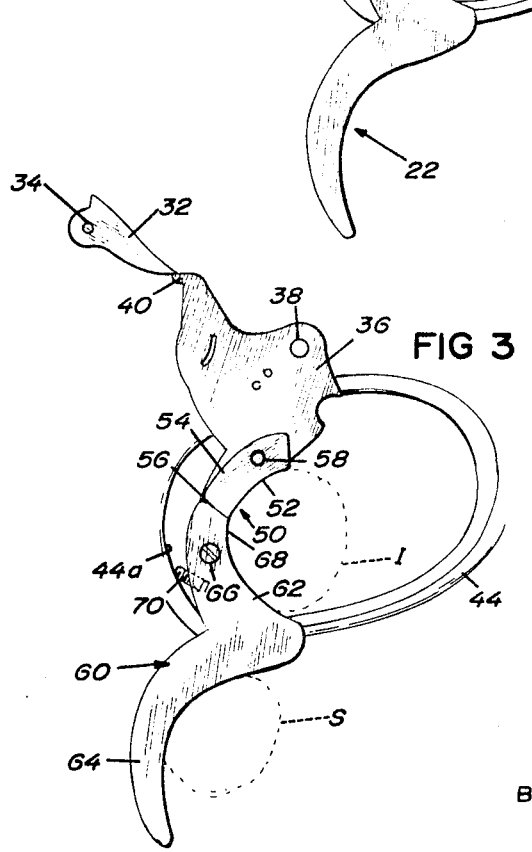
FIGURE 3 is a fragmentary side elevational view of the auxiliary device moved to its intermediate position, with the auxiliary trigger in its shooting trigger blocking position.

In use and operation, the trigger assembly 22 is moved from the forward inactive position of FIGURE 2 to the position shown in FIGURE 3 by engaging the lower portion 64 of the auxiliary trigger 60 with the second finger shown in dotted lines and designated S. When moved in such a manner, the auxiliary trigger 60 pivots about its pivot screw 66 to bring the sloped abutment surface 68 thereon into contact with the sloped abutment surface 56 on the shoe 50. In FIGURE 3, the auxiliary trigger 60 is moved to its rearward position; that is, the position whereat the adjustable screw 70 engages the rear inner surface 44a of the trigger guard and whereat the shoulder surface 68 continuously engages its mating shoulder surface 56. However, it is important to note that although in this position the auxiliary trigger 60 is at its rearward position, the shooting trigger 36 is only at some intermediate position between its inactive position (FIGURE 2) and its firing position (FIGURE 5).

With reference now made to FIGURES 1 and 3, there will be described hereinafter the blocking action accomplished by means of the present invention. When the device is moved to the position shown in FIGURE 3, the shooting trigger now cannot be retracted from its intermediate position to its rearward firing position because of the following factors: (1) digital pressure, (2) a lever defined by the auxiliary trigger 60, (3) a fulcrum formed by the adjustable screw 70, (4) a fulcrum base formed by the rear inside surface of the trigger guard 44a, (5) a lever stop control formed by the mating abutment surfaces 56, 68, (6) a swing base formed by the shooting trigger 36, (7) a counter-leverage anchor formed by the shooting trigger pivot stud 38, and (8) a lever train load caused by reaction from the hammer spring 48 transmitted through the sear 32 and the hammer 36.

With the foregoing in mind, it will be understood that as the auxiliary trigger 60 is retracted by digital pressure from the finger S, reaction from the hammer spring 48 is relayed through the hammer 26, the hammer sear 32, and the shooting trigger 36 to the shooting trigger pivot stud 38 to provide a counterforce which acts in opposition to the digital pressure applied by the finger S to the auxiliary trigger 60. This counterforce initially closes the gap between the abutment surfaces 56, 68, thereby effecting a controlled stop for the swinging movement of the auxiliary trigger about its pivot screw 66. Upon completion of the closing of the gap between the abutment surfaces 56 and 68, the pressure applied by the finger S acts in opposition to the counterforce described hereinabove to enable the auxiliary trigger to be moved rearwardly to the position shown in FIGURE 3. Upon completion of such retraction or rearward movement of the auxiliary trigger 60, the terminal end of the adjustable screw 70 abuts against the inside rear surface 44a of the trigger guard 44 and continued application of digital pressure by the finger S causes fulcrum action from the adjustable screw 70, upon its fulcrum base 44a, initiating lever action from the auxiliary trigger 60. As digital pressure continues to be applied to the outer extension 64 of the auxiliary trigger 60, the fulcrum 70 bears upon the fulcrum base 44a enabling multipled leverage force of the auxiliary trigger to exert force upon the pivot screw 66 which forms the point of load. Since the mating abutment surfaces 56 and 68 are closed and in contact, as aforesaid, the multipled force is transmitted directly to the shooting trigger 36. As aforesaid, the shooting trigger 36 is fixed to its pivot stud 38, and is now rigidly and immovably bound under multipled force of the auxiliary trigger leverage application, between the fulcrum 66 and the shooting trigger pivot stud 38.

Referring again to FIGURE 1, the auxiliary trigger is in its full retracted position of FIGURE 3, the hammer sear 32 is in locked engagement with the rearmost portion of the sear actuating trigger lip 40, as shown, the hammer 26 is held in a firmly cocked position and is safety blocked. The term "safety blocked" as used herein, is intended to mean that the shooting trigger 36 cannot be fully retracted to its firing position and thus the revolver cannot be, either inadvertently or purposely, fired.

It is also important to note that although the hammer 26 is cocked, when the auxiliary trigger is in its full retracted position of FIGURE 3, such hammer can be released and returned forward to its security position merely by relieving pressure from the fingers I and S. In other words, although the hammer can be held in a cocked position for extended durations of time, merely by using finger pressure to hold the auxiliary trigger in its full rearward position of FIGURE 3, such hammer can be released from the cocked position, when desired, and whether the auxiliary trigger is in its full retracted position or is being released, there is no fear of accidentally or inadvertently firing the revolver.

Referring now to FIGURE 4, the shooting trigger 36 is still shown in its intermediate position, but finger pressure on the auxiliary trigger 60 has been released, thus enabling the abutment surfaces 56 and 68 to separate slightly. Although the showing in FIGURE 4 is greatly exaggerated for purposes of illustration, the dashed line position corresponds to the position of the auxiliary trigger shown in FIGURE 3, and the solid line position shows the location of the auxiliary trigger when pressure thereon is slightly released, thus enabling such trigger to pivotally rotate about its pivot screw 66. Actually, such movement is effectuated by an almost imperceptible release of pressure by the second finger S upon the lower portion 64 of the auxiliary trigger. After the auxiliary trigger has been so released, its safety blocking feature is no longer effective, and the shooting trigger 36 may then be retracted to firing position. However, if it should again be desired to block the trigger, before firing is effected, this can be accomplished merely by re-applying pressure to the lower portion 64 of the auxiliary trigger, and thus bringing the abutment surfaces 56 and 68 back into contact providing a solid abutment through which the blocking leverage force can be properly transmitted. As will be apparent from the position of the hammer sear 32 and the sear actuating lip 40, the trigger 36 in FIGURE 4 remains in exactly the same intermediate position as shown in FIGURE 3.

When after the auxiliary trigger has been released, as shown in FIGURE 4, to fire the revolver, rearward pressure of the index finger I is applied to the depending portion 42 of the trigger by pressing against the forward wall 52 of the trigger shoe 50. When this occurs, the trigger pivots about its pivot stud 38 and the sear actuating trigger lip 40 slides out from beneath the hammer sear 32, thus enabling the hammer 26 to be released to swing forwardly from its cocked position to strike and fire a cartridge in the revolver. It is important to note that the shooting trigger 36 can move from its intermediate position to its firing position due to the fact that the abutment surfaces 56 and 68 are not in contact. In this position auxiliary trigger 60 does not provide a blocking effect on the shooting trigger 36 because the mating surfaces 56 and 68 are not held together in firm abutment.

From the foregoing description of the embodiment of the present invention illustrated in FIGURES 1–5, it should be apparent to one skilled in the art that the present invention provides a vast improvement over the conventional, and commercially obtainable, form of revolver. If the revolver shown in FIGURE 1 were provided in its usual form, that is, without the provision of the auxiliary device 22, the shooting trigger 36 would require a triggger pull of 9 to 12 pounds during a double action shooting operation. When the auxiliary device 22 of the present invention is utilized in conjunction with the conventional revolver, a trigger "boosting" effect is produced which greatly reduces the amount of trigger pull required to fire the revolver. The revolver trigger is "boosted" by virtue of having its own leverage power increased. The shooting trigger, pivoted from its stud 38, is a lever in itself provided to overcome the combined powers of the hammer spring 48 and the spring load of the rebound slide 46 to cock the hammer 26 without requiring exertion of an undue amount of force. Thus, using the auxiliary trigger device of the present invention, the boosting effect assures that a trigger pull of 2½ to 3 pounds is sufficient to retract the auxiliary device to the position of FIGURE 3.

Because of the aforesaid "boosting" effect on the revolver trigger, a further effect, referred hereinafter as the "accelerating" effect, is likewise produced. This "accelerating" effect is accomplished by virtue of the leverage power of the auxiliary trigger enabling hammer cocking with considerably less exertion of force. Since the movement of the auxiliary trigger requires less force to cock the hammer, it naturally follows that the hammer will be cocked considerably faster. Therefore, it can be seen that the present invention provides a device which enables the hammer on a conventional revolver to be cocked very quickly and with the exertion of a minimum amount of force, as contrasted with the conventional revolver wherein hammer cocking must be accomplished through greater exertion of digital force which takes a considerably longer time.

In FIGURES 6 and 7, there is illustrated a modified embodiment of revolver lock auxiliary device 22 whose basic cocking and safetying operation is the same as the auxiliary device described hereinabove. However, additionally, it is constructed in such a manner that the lower portion 64 of the auxiliary trigger 60 may be adjusted relatively to the upper portion 62 thereof. To this end, the upper and lower portions, 62 and 64 respectively, are formed as separate parts. The upper portion 62 is provided with a shoulder 80 having a tooth 82 depending therefrom. Beneath the shoulder 80, the upper portion 62 is undercut, as illustrated by the reference numeral 84. The lower portion 64 of the auxiliary trigger is disposed beside the undercut portion 84, and is provided with a first surface 86 adapted to conform contiguously to the shoulder 80 and another portion having a plurality of teeth thereon which define, between them, a series of grooves 88 which can accommodate the depending tooth 82. A screw 90 is used to mount the lower portion 64 to the upper portion 62 in the manner illustrated. In its normal position, as shown in FIGURE 7, the surface 86 is in contact with the shoulder 80, and the tooth 82 is disposed within the first groove 88. However, if the shooter should desire to adjust the lower portion to a more rearward position, as shown in FIGURE 6, the screw 90 can be temporarily removed, and the lower portion 64 can be removed and re-applied with the tooth 82 disposed in one of the other grooves 88. In this manner, the angular position of the lower portion may be varied, as desired by the shooter.

FIGURE 8 is another view of the auxiliary device 22 as shown in any one of the preceding figures, and it illustrates the particular disposition of the parts previously described. For example, the angular disposition of the adjustment screw 70 can be readily appreciated from FIGURE 8, and it will be seen that because of such angular disposition, the terminal end of the adjustment screw can abut against the rear inside surface 44a of the trigger guard 44, although the auxiliary trigger 60 itself is actually disposed beside the trigger guard. Also, FIGURE 8 shows that the shoe 50 is secured to the shooting trigger 36 by a series of set screws 58 which project through the opposite side walls 54 of the shoe 50. The auxiliary device 22 can thus be mounted upon any conventional revolver trigger, merely by tightening the set screws 58 and the auxiliary trigger pivot screw 66 to its fullest depth whereupon it bears in binding friction upon the side wall surface of the trigger. Although the illustrated embodiment indicates its use by right-handed shooters, it will be understood that the invention is readily adaptable for use by left-handed shooters, by simply removing the auxiliary trigger from the right side of the trigger shoe, and the replacement of the left-handed auxiliary trigger to the left side of the trigger shoe, securing the same with its same pivot screw into the threaded hole provided therefor.

The adjustment means 70, as aforesaid, is utilized to vary the "stroke" of the trigger, and by suitably adjusting such means, the rearward position of the auxiliary trigger, and hence the intermediate position of the shooting trigger, can be varied as desired to alter the variable relationship between the trigger lip 40 and the hammer sear 32 to determine the desired degree of hammer block security or desired degree of trigger pull force required. The screw 70 also provides adjustability for adapting the lock auxiliary device to various makes, models and peculiarities of various brands of revolvers. This is necessary due to varying trigger and hammer sear operating relationship differences in the various brands of revolvers.

In the embodiment shown in FIGURE 9, the abutment shoulder 56 is eliminated on the trigger shoe 50, and instead, a stationary cam 94 is provided, mounted on the shoe by means of a screw 96. Naturally, by loosening the screw 96, the position of the cam 94 can be varied, but upon retightening of the screw 96, the cam is held stationary as a firm immovable abutment. On the auxiliary trigger, the upper abutment surface, designated 68', is arcuately contoured somewhat to conform generally to the shape of the cam. Thus, when operated in the manner previously disclosed, the abutment surface 68' will contact the cam surface 94 to provide generally the same lever stop control action as that previously described in connection with the mating abutment surfaces 56 and 68. However, it is by varying the setting of this cam that the intermediate position of the shooting trigger is varied, and hence accordingly, he variable degree of hammer locking security or degree of trigger pull force required. This enables a very accurate adjustment which can give the shooter "a hair trigger" action, when he so desires. Because the cam 94 now acts as an adjustment means, it is not necessary in this embodiment to provide adjustable screw 70 to accomplish this purpose, and instead, a stud 98 may be provided in the upper portion 62 of the auxiliary trigger merely to engage the inner rear surface of the trigger guard.

In FIGURE 10, the embodiment of FIGURE 9 is reversed; that is, a stud 100 is provided in projecting relation from a side of the trigger shoe 50 and the curved abutment face 68' on the auxiliary trigger abuts against this stud. To provide adjustability, a cam 102 is mounted by a screw 104 in the upper portion of the auxiliary trigger 60. The surface of the cam 102 abuts against the inner rear wall 44a of the trigger guard 44, and thus serves to adjust the intermediate position of the shooting trigger. The position of the cam 102 can be adjusted by means of loosening the screw 104, manually rotating cam 102, and then retightening the screw 104.

A further modified embodiment of the present invention is shown in FIGURES 11 and 12, and again, in these figures, the lower portion 64 of the auxiliary trigger or the auxiliary trigger extension, can be adjusted relatively to the upper portion 62 thereof. However, the main feature of this embodiment is that of enabling the functions of hammer cocking and blocking, and trigger blocking, to be accomplished with the auxiliary trigger either attached or detached. This is accomplished by a single finger operation of the index finger actuating the auxiliary device to retract the same in hammer cocking movement, and said index finger bearing with pressure upon lower finger engageable surface 62a with the main pressure naturally being exerted below the pivot screw 66 as the rearward angulation of the trigger assembly increases in retraction. In this embodiment, the abutment shoulder 56 is eliminated from the side of the trigger shoe and instead, an outwardly projecting stud 106 is provided. The upper portion 62 of the auxiliary trigger is provided with a slot 108 which surrounds the stud 106. In operation, with or without the auxiliary trigger extension 64, pivotal movement of the auxiliary trigger device about its pivot 66 will result in the slot 108 moving into engagement with the stud 106, to thus limit the movement of the pivoting member to bring the adjustable screw fulcrum 70 into proper contact with the inner surface of the trigger guard to effect the leverage force trigger blocking application, as hereinbefore described. In this embodiment, the release of the trigger blocking is accomplished by a simple shift of finger pressure from the lower trigger assembly surface 62a to the surface 50a of the trigger shoe, in the natural movement of the shooting trigger retraction to fire the weapon.

Adjustment of the so-called "stroke" of the trigger, to thus adjust the intermediate position thereof, is accomplished by use of the adjustable screw means 70, previously described. As in the embodiment of FIGURES 6 and 7, the lower portion 64 of the auxiliary trigger is formed separately of the upper portion 62 thereof. In the lower portion 64, there is an elongated, somewhat arcuately curved slot 110 at the upper end thereof. A screw 112 projects through the slot 110 and into the upper portion 62 of the auxiliary trigger with the head of the screw 112 being somewhat larger than the width of the slot or groove 110. Normally, the lower portion 64 of the auxiliary trigger can be maintained in its normal position, as shown in FIGURE 11, but if desired, the lower portion can be moved to a more rearward position or adjusted at various positions along the slot at angles or up or down, as shown in FIGURE 12, merely by loosening the screw 112 and subsequently re-tightening the same, or as aforesaid, removed altogether.

In FIGURE 13, the revolver 20 is shown disposed within a holster generally designated 114. As is apparent, when the revolver is so disposed within the holster, the auxiliary trigger 60 projects beyond the edge of the holster, thus facilitating quick and easy digital contact for the immediate retraction of the trigger and subsequent cocking of the hammer, as shown, and additionally providing a convenient surface to easily grasp in addition to the revolver butt or handle to facilitate fast removal of the weapon from its holster. With the usual form of prior art revolver, in order to withdraw the same from the holster, in a condition ready to be fired, it was necessary for the shooter to insert his index finger in the narrow clearance between the shooting trigger and the trigger guard, or to thumb cock the revolver first and to then withdraw the revolver as rapidly as possible. In the present invention, such slow and awkward operation is not necessary, as shown in FIGURE 13. Not only can the revolver be quickly withdrawn from the holster, but also, rearward pressure on the auxiliary trigger 60 simultaneously cocks the weapon, and at that same time instantly greater enlarges the finger clearance between the shooting trigger and the trigger guard, thus allowing quick and easy insertion of the index finger into the said clearance and upon the shooting trigger. It should thus be obvious that the present invention is extremely useful under emergencies, wherein a law enforcement officer must quickly unholster and shoot his revolver.

In the embodiment shown in FIGURE 14, a compound form of trigger assembly 22 is illustrated. The trigger shoe 50 is essentially the same as that previously described, except that the abutment shoulder 56 is eliminated, and in its place, a stud 114 is provided. The auxiliary trigger means has a separate upper portion 62 and lower portion 64. The upper portion 62 is pivotally mounted by means of a pivot screw 116 mounted near its lower end. At its upper end, a slot 118 is provided in surrounding relationship to the stud 114 on the trigger shoe 50. The adjustable means 70 extends through an aperture 72 in the portion 62. At the forward lower end of the portion 62, beneath its pivot screw 116, a shaped notch 120 is provided. The lower auxiliary trigger portion 64 is also pivotally mounted to the trigger shoe by means of a pivot screw 122, and is provided with a nose 124 which engages within the notch 116. Thus, when the lower trigger portion 64 is manually retracted, the nose 124 causes the upper portion 62 to pivot about its pivot screw 116. The stud 114 and slot 118 provide lever stop control of lever member 62. The screw 70 stops the shooting trigger 36 in intermediate position as hereinbefore explained. This provides the desired blocking effect which prevents firing of the shooting trigger 36. However, a slight releasing pressure on the lower auxiliary trigger portion 64 releases the forward edge of the notch 118 from engagement with the stud 114, and enables firing retraction of the shooting trigger. The embodiment of FIGURE 14 is of the type which functions in trigger blocking, equally well with or without the benefit of the leverage of the auxiliary trigger extension 64. However, the difference between this embodiment and that of FIGURES 11 and 12 is that index finger operating pressure is applied above the pivot 116 instead of therebeneath.

In FIGURES 15 and 16, there is shown a still further embodiment of the present invention, operable with the auxiliary trigger detached. In such embodiment, a pair of spaced ears 130 are projecting laterally from the side of the trigger shoe 50. The auxiliary means 22 includes a body portion 132 adapted to be disclosed between the spaced ears 130 and a finger engageable portion 134 forwardly thereof. A pivot pin 136 projects through the ears and the body portion 132 to pivotally mount the means to the side of the trigger shoe 50. The adjustable screw means 70 projects angularly through the body portion 132, as in previously described embodiments. As shown in FIGURE 16, and as is apparent because of the disposition of the pivot pin 136, the finger engageable portion 134 is swingable toward and away from the side 54 of the trigger shoe 50. As shown in solid lines in FIGURE 15, when the shooter grasps the trigger shoe with his index finger, the finger engageable portion 134 is pressed into abutment with the side 54 of the trigger shoe. In this position, the trigger can only be retracted for a certain distance until the end of the adjustable screw 70 contacts the rear surface 44a of the trigger guard. When this occurs, the blocking action takes place, and the shooting trigger 36 cannot be moved further rearwardly. Although the embodiment herein can be operated without the auxiliary trigger 60, it can also be operated with the auxiliary trigger attached so that the nose 138 at the upper edge thereof fits behind and exerts leverage force upon the inner curved portion of the pivotable member 134 at its lower surface 140. So long as rearward pressure is applied on the auxiliary trigger 60, the nose 138 will hold the portion 134 in contact with the side of the trigger shoe 50, as shown in solid lines in FIGURE 16. However, when pressure is released on the auxiliary trigger 60, the nose 138 can retract and the pivotable member 134 may swing outwardly to its dotted line position of FIGURE 16, thus unblocking the trigger and enabling the revolver to be fired.

In the embodiment of invention shown in FIGURE 17, there is illustrated a revolver lock construction shown in "short action" cocked position, with hammer sear means 142 provided to eliminate the necessity for manually holding the trigger retracted and the hammer cocked. With reference to the revolver lock aspects of the present invention, it will be understood that the revolver lock shown in FIGURE 17 operates the same as the revolver lock auxiliary mounted upon a conventional revolver, with one very important exception. Although the hammer lock auxiliary system provides digital hammer cocking and blocking and shooting trigger blocking, it is necessary to digitally or manually hold the auxiliary trigger fully retracted to maintain the hammer cocked and ready for firing. The present revolver lock, while accomplishing the same results in the same manner of operation, additionally provides for a construction that mechanically holds the hammer in its cocked position by means of the new and novel hammer sear means 142. Basically, the hammer sear means construction shown in FIGURES 17–20 includes a sear notch that engages upon the shooting trigger lip. Upon full retraction of the "accelerator" trigger and the subsequent backward cocking of the hammer, the tip of the trigger lip engages into the hammer sear notch on an oblique angle with respect to the relative positions of the hammer sear pivot pin and the shooting trigger pivot stud. The spring energized hammer therefore causes the hammer sear to bear upon the trigger lip under forceable pressure causing the trigger and hammer to stop and hold inert in their respective pivotal positions about their pivot member. Thus, the hammer is held in cocked position and the triggers are prevented from returning back to their former "inactive" or forward position. The shooter, however, can hold the accelerator trigger to its full retracted position, thus blocking the shooting trigger for safety, if he wishes, or alternatively, he may simply relax his second finger from any tension on the accelerator trigger, being able at will to instantly re-apply the trigger block, should the need for it arise.

Also, there is provision for hammer sear notch construction by adapter means in the form of a bifurcated spring steel clip that has the sear notch provided on its solid end and a split opening on its other end to facilitate mounting upon the conventional hammer sear with powerful binding friction. It might be well pointed out here that this sear notch adapter device can be mounted upon conventional revolver hammer sears in addition to the mounting of the revolver lock auxiliary device, thereby obtaining the same results from the conventional revolver as can be obtained from the present embodiment of revolver lock invention.

Although the present embodiment of invention, in its complete construction, provides for complete revolver function, as in conventional constructions, FIGURE 17 shows only the construction essential for hammer cocking, holding the hammer in cocked position, applying and holding trigger safety blocking and firing of the weapon. The revolver lock mechanism includes a hammer 26, previously described, which is pivotally mounted upon its pivot stud 28. The shooting trigger 36 is provided with a lip 146 adapted for engagement with a notch 148 in the forward end of the hammer sear means 142. The sear means 142 is pivotally mounted to the hammer by a pivot pin 152.

An accelerator trigger generally designated 150 is pivotally mounted upon the side of the shooting trigger 36 by a pivot screw 151 and is provided with an enlarged or thickened portion 166 containing a threaded aperture 153 into which is mounted an adjustable screw 155. The portion 166 forms an elbow 168 adjacent the base of the trigger guard 44 and connects integrally with a finger engageable portion 157 of the accelerator trigger means 150, thus enabling positioning of the accelerator trigger finger engageable portion 157 directly beneath the trigger guard 44.

The accelerator trigger means 150 is manually retracted fully from its inactive forward position to its rearward position whereupon the adjustable screw 155 abuts the inner surface 44a of the trigger guard 44, simultaneously causing the hammer to pivot about its pivot stud 28 backward in main spring energizing and cocking movement. At the zenith of this movement, the upper projecting tip 146 of the trigger guard engages into the hammer sear notch 148 on oblique angles with respect to the plane of the relative positions of the hammer sear pivot pin 152 and the shooting trigger pivot stud 38, as illustrated in FIGURE 17 by the broken line 170 tracing through the plane extending between the respective pivot points 152 and 38. This angle of engagement prevents any downward thrust by the hammer sear upon the trigger lip that might cause the lip 146 to move downwardly through and beneath the plane indicated by the broken line 170 which would allow the inadvertent forward movement of the trigger assembly from its full rearward position and the subsequent dropping of the hammer.

Firing of the revolver is accomplished by release of digital pressure from the accelerator trigger 157, thereby releasing the trigger block safety, as hereinbefore described. As forefinger pressure is applied to the shooting trigger 36, it is pivoted about its pivot stud 38, causing the trigger lip 146 to slide its tip from engagement with the hammer sear notch 148, allowing the hammer 26 to be driven forwardly by the power of the main spring 158 to strike and explode the cartridge.

By referring to the enlarged view of the hammer sear means 142 shown in FIGURE 18, it can be seen that the hammer sear can be manufactured as a separate and improved single element, having the groove 148 formed in its forward face. Alternatively, instead of being separately manufactured as a new element, an adapter device can be applied to the hammer sear conventionally used in revolvers. As shown in FIGURES 19 and 20, the conventional hammer sear 171 is provided with a pair of spaced parallel depending side walls 172, which define therebetween a longitudinally extending central channel 173. An adapter device generally designated 144 is formed as a bifurcated spring steel clip having spaced apart upper and lower clamping legs 144, which are joined together at their forward ends by a web having a notch 148 formed therein. In FIGURE 20, the adapter device 144 is shown separated from the sear means 142, but it will be clear from the showing of FIGURE 19, that the adapter device is applied to the hammer sear by attaching the same to the forward end of the sear with the sear side walls 172 forming a guiding means for directing the lower leg 174 of the clip into the longitudinal central channel 173. When the clip is so applied to the hammer sear, it is held thereon by frictional engagement of the legs 174 with the sear itself.

As can best be seen from FIGURE 23, the lower portion of the shooting trigger 36 is widened to provide a broad finger gripping surface 160 which is wider than the finger gripping surface customarily provided on the forward face of the shooting trigger. Side wall portions 164 are disposed on opposite sides of the shooting trigger adjacent the portion 160 and terminating short of the lower end thereof to provide a pair of diametrically opposed abutment shoulders 162, 162. By referring to FIGURE 21, it can be seen that the widening of the shooting trigger 160 disposes the abutment shoulders 162, 162 in outwardly spaced relationship from the side of the trigger guard 44. Thus, the accelerator trigger 150 can be attached to either of the abutment shoulders 162, as desired, and when so attached, the accelerator trigger has a clearance along the side of the trigger guard which permits free swing thereof. The side elevational view shown in FIGURE 22 illustrates that a threaded aperture 180 is provided in the shooting trigger at some point spaced beneath the abutment shoulders 162, and thus, the accelerator trigger means 150 can be attached to the shooting trigger by engaging the pivot screw 151 within this threaded aperture 180.

It is clear from the showing in FIGURE 21 that the central portion 157 of the accelerator trigger is disposed directly beneath the trigger guard 44 of the revolver. It thus provides for use by right or left-handed persons with equal facility, and additionally, allows for changing the revolver from one hand to the other, as is required in the proper method of searching a suspect. Thus, even if the revolver were shifted from the right hand to the left hand, or vice versa, finger application upon both the shooting and the auxiliary trigger can be executed with impunity during the change of hands.

After reading the foregoing detailed description, it will be apparent to one skilled in the art that the objects set forth at the outset of the specification have been successfully achieved.

Accordingly, what is claimed is:

1. In a revolver having a firing mechanism and a shooting trigger operatively connected thereto, the combination comprising:

said shooting trigger being movable between a forward inactive position and a rearward firing position; and digitally engageable auxiliary means secured to said shooting trigger;

said auxiliary means having a forward and a rearward position;

said auxiliary means being digitally operable to move from its forward position to its rearward position to simultaneously move said shooting trigger from its forward position to an intermediate position between its forward and firing positions;

said auxiliary means, when in its rearward position, preventing said shooting trigger from moving from its intermediate position to its firing position;

said auxiliary means being releasable from its rearward position for movement toward its forward position whereupon said shooting trigger can be digitally moved from its intermediate position to its firing position to operate said firing mechanism;

said auxiliary means including an adjustable means which varies said shooting trigger intermediate position.

2. The combination defined in claim 1 wherein said revolver includes a trigger guard at least partially surrounding said shooting trigger and wherein said adjustable means is an adjustable screw, the end of which can abut against said trigger guard.

3. The combination defined in claim 1 wherein said revolver includes a trigger guard at least partially surrounding said shooting trigger and wherein said adjustable means is an adjustable cam, the periphery of which can abut against said trigger guard.

4. In a revolver having a firing mechanism and a shooting trigger operatively connected thereto, the combination comprising:

said shooting trigger being movable between a forward inactive position and a rearward firing position; and digitally engageable auxiliary means pivotally secured to the side of said shooting trigger;

said auxiliary means having an inward and an outward position;

said auxiliary means being digitally operable to move from its outward position to its inward position during simultaneous movement of said shooting trigger from its forward position to an intermediate position between its forward and firing positions;

said auxiliarly means, when in its inward position, preventing said shooting trigger from moving from its intermediate position to its firing position;

said auxiliary means being releasable from its inward position for movement toward its outward position whereupon said shooting trigger can be digitally moved from its intermediate position to its firing position to operate said firing mechanism;

said auxiliary means including an adjustable means which varies said shooting trigger intermediate position.

5. In a revolver having a shooting trigger at least partially surrounded by a trigger guard and having a hammer movable between cocked and uncocked positions, an auxiliarly means adapted for manual actuation, control and safetying of the revolver hammer cocking operation, said auxiliary means comprising:

a shoe means mounted upon said shooting trigger;

said shoe means including at least one side portion having a shaped abutment surface thereon;

auxiliary trigger means having an upper portion juxtaposed to said shoe means side portion;

pivotal attachment means coupling said side portion and said upper portion together to enable said auxiliary trigger means to move relatively to said shoe means;

said auxiliarly trigger means upper portion including a shaped abutment surface complemental to said shoe means abutment surface whereby said abutment surfaces can be brought into contact with one another by relative movement of said auxiliary trigger means;

said auxiliary trigger means further including a lower finger engageable portion depending downwardly beneath said revolver trigger guard and adapted to be engaged by a shooter's finger; and adjustable means disposed on said auxiliary trigger means and being adjustable to extend rearwardly for a predetermined distance;

said auxiliary means being operative, upon application of rearward digital pressure on said lower finger engageable portion, to move said shooting trigger rearwardly until said adjustable means abuts against said trigger guard, thereby displacing said shooting trigger to an intermediate position between its forward inactive position and its rearward firing position;

said movement of said shooting trigger to its intermediate position at least partially cocking said hammer and bringing said abutment surfaces into contact with one another, thereby preventing said shooting trigger from moving from its intermediate position to its firing position;

said auxiliary means being releasable from its said operative position by release of digital pressure from said lower finger engageable portion whereupon said shooting trigger can be digitally moved from its intermediate position to its firing position, thereby simultaneously moving said hammer first to its cocked position, then releasing said hammer to permit it to swing forwardly for firing a cartridge in said revolver.

6. Auxiliary means as defined in claim 5 wherein said abutment surfaces are each generally planar.

7. Auxiliary means as defined in claim 5 wherein said shoe means abutment surface is a projection having a rounded periphery and wherein said upper portion abutment surface is arcuate in configuration.

8. Auxiliary means as defined in claim 7 wherein said projection has a cammed periphery which can be selectively adjusted for engagement with said arcuate abutment surface.

9. Auxiliary means as defined in claim 5 wherein said adjustable means is a screw having a rearwardly projecting shank portion.

10. Auxiliary means as defined in claim 5 wherein said adjustable means is a cam member which can be selectively moved to vary which portion of the cam surface is aligned for engagement with said trigger guard.

11. Auxiliary means as defined in claim 5 wherein said lower finger engageable portion is disposed to one side of said trigger guard.

12. Auxiliary means as defined in claim 11 wherein said lower portion is angularly adjustable relative to said upper portion.

13. Auxiliary means as defined in claim 12 wherein one of the said portions is provided with a projecting tooth and the other of said portions is provided with a series of spaces, one of which can selectively be engaged with said tooth.

14. Auxiliary means as defined in claim 12 wherein one of said portions is provided with an elongated arcuate slot and wherein the other of said portions includes screw means extending through said slot, said screw means being adapted to be loosened to permit said slotted portion to be adjusted relatively thereto and to thereafter be tightened to maintain said slotted portion in its adjusted position.

15. In a revolver having a hammer and a shooting trigger at least partially surrounded by a trigger guard, an auxiliary means for controlling movement of said hammer and said shooting trigger comprising:
    said shooting trigger having the lower portion thereof enlarged to substantially the width of said trigger guard;
    said shooting trigger having at least one radially extending abutment shoulder projecting beyond the side of said trigger guard;
    said shooting trigger having a threaded aperture therein beneath said abutment shoulder;
    said auxiliary means including an upper portion, an intermediate portion and a lower portion;
    said upper portion having an aperture therein adapted to be aligned with said threaded aperture for reception of a pivot screw means which, when screwed into said threaded aperture, pivotally mounts said auxiliary means upon said shooting trigger;
    said upper portion having an abutment shoulder thereon which can be pivoted into engagement with said shooting trigger abutment shoulder;
    said lower portion forming an auxiliary trigger member disposed directly beneath said trigger guard;
    said intermediate portion interconnecting said upper and lower portions together; and
    adjustable means projecting rearwardly from said intermediate portion for engagement with said trigger guard rear inner surface when digital pressure causes said auxiliary and shooting triggers to retract rearwardly;
    said engagement of said adjustable means being preceded by pivotal movement of said auxiliary means to bring said abutment shoulders into contact with one another whereupon engagement of said adjustable means defines an intermediate position for said shooting trigger;
    said shooting trigger in its intermediate position being prevented from rearward movement until pressure on said auxiliary trigger is released, and thus serving to hold said hammer in a partially cocked position.

16. In a revolver as defined in claim 15, said hammer having a sear means pivotally mounted thereon and adapted for engagement with an actuating lip on said shooting trigger, and notch means provided in said sear means for locking said hammer in said partially cocked position when said actuating lip enters said notch means.

17. In a revolver having a pivotally mounted shooting trigger, a pivotally mounted hammer and a sear means pivotally mounted on said hammer and adapted for engagement with an actuating lip on said shooting trigger, the improvement in a revolver lock comprising providing said sear means with a notch on the forward end thereof, said notch being shaped to receive and accommodate said actuating lip, said notch serving to retain said lip above the plane extending between said sear means pivot mount and said hammer pivot mount, thus maintaining said hammer in at least partially cocked position, said sear means including a sear element and an adapter device frictionally engaged thereon, said adapter device being a bifurcated clip having an angled notch formed in a web interconnecting said bifurcations at the forward end thereof.

18. In a revolver having a firing mechanism and a shooting trigger operatively connected thereto, the combination comprising:
    said shooting trigger being movable between a forward inactive position and a rearward firing position; and
    digitally engageable auxiliary means secured to said shooting trigger;
    said auxiliary means having a forward and a rearward position;
    said auxiliary means being digitally operable to move from its forward position to its rearward position to simultaneously move said shooting trigger from its forward position to an intermediate position between its forward and firing positions;
    said auxiliary means, when in its rearward position, preventing said shooting trigger from moving from its intermediate position to its firing position;
    said auxiliary means being releasable from its rearward position for movement toward its forward position whereupon said shooting trigger can be digitally moved from its intermediate position to its firing position to operate said firing mechanism;
    said auxiliary means including a first means secured to said shooting trigger and a second means pivotally mounted upon said first means;
    a trigger guard at least partially surrounding said shooting trigger;
    said second means including an auxiliary extension trigger which depends downwardly beyond said trigger guard;
    said second means also including a portion independent of said auxiliary extension trigger, with said portion being pivotally mounted upon said first means, and said auxiliary extension trigger being adjustably secured to said portion for angular movement relative thereto.

References Cited by the Examiner

UNITED STATES PATENTS

| | | | |
|---|---|---|---|
| 336,021 | 2/1886 | Smith | 42—65 |
| 339,301 | 4/1886 | Johnson | 42—65 |
| 361,100 | 4/1887 | Wesson | 42—65 |
| 881,374 | 3/1908 | Call | 42—65 |
| 1,112,055 | 9/1914 | D'Amore. | |

BENJAMIN A. BORCHELT, *Primary Examiner.*